(12) United States Patent
Schaumberger

(10) Patent No.: US 11,090,672 B2
(45) Date of Patent: Aug. 17, 2021

(54) DEVICE FOR PRINTING IMAGES ON FLOOR SURFACES

(71) Applicant: Pixelrunner GmbH, Hagenberg (AT)

(72) Inventor: Ronald Schaumberger, Pregarten (AT)

(73) Assignee: PIXELRUNNER GMBH, Hagenberg (AT)

(*) Notice: Subject to any disclaimer, the term of this patent is extended or adjusted under 35 U.S.C. 154(b) by 0 days.

(21) Appl. No.: 16/466,937

(22) PCT Filed: Dec. 7, 2017

(86) PCT No.: PCT/AT2017/060329
§ 371 (c)(1),
(2) Date: Sep. 3, 2019

(87) PCT Pub. No.: WO2018/102846
PCT Pub. Date: Jun. 14, 2018

(65) Prior Publication Data
US 2019/0381529 A1 Dec. 19, 2019

(30) Foreign Application Priority Data
Dec. 7, 2016 (DE) .................. 10 2016 123 731.0

(51) Int. Cl.
| | |
|---|---|
| *B05B 9/04* | (2006.01) |
| *B41J 3/28* | (2006.01) |
| *B05B 12/04* | (2006.01) |
| *B05B 15/555* | (2018.01) |
| *B05B 13/04* | (2006.01) |
| *B41J 2/165* | (2006.01) |
| *B41J 3/407* | (2006.01) |

(52) U.S. Cl.
CPC ............ *B05B 12/04* (2013.01); *B05B 9/0413* (2013.01); *B05B 13/0431* (2013.01); *B05B 15/555* (2018.02); *B41J 2/16552* (2013.01); *B41J 3/28* (2013.01); *B41J 3/407* (2013.01)

(58) Field of Classification Search
None
See application file for complete search history.

(56) References Cited

U.S. PATENT DOCUMENTS

| | | | |
|---|---|---|---|
| 6,330,503 B1 * | 12/2001 | Sharp | B05B 12/124 701/50 |
| 6,550,889 B2 * | 4/2003 | Colombat | B41J 2/16552 347/28 |
| 8,622,500 B2 * | 1/2014 | Kagata | B41J 2/16579 347/14 |

FOREIGN PATENT DOCUMENTS

| | | |
|---|---|---|
| DE | 10390349 B4 | 12/2010 |
| EP | 2433716 A1 | 3/2012 |
| EP | 2641661 A1 | 9/2013 |

(Continued)

*Primary Examiner* — Alejandro Valencia
(74) *Attorney, Agent, or Firm* — Murphy, Bilak & Homiller, PLLC

(57) ABSTRACT

A device (100) such as a mobile robot for printing an image on a floor surface (1) is described. According to an exemplary embodiment, the mobile robot comprises a control system (117) and a printing system. The printing system has at least one colorant tank (110, 111, 112) with colorant and at least one spraying arm (201, 202, 203) having multiple nozzle assemblies (211) situated next to one another. The nozzle assemblies (211) each have a valve (212) that can be controlled by the control system and a colorant nozzle (210, 220, 230) by means of which colorant can be applied to the floor surface (1).

15 Claims, 6 Drawing Sheets

(56) References Cited

FOREIGN PATENT DOCUMENTS

| | | | |
|---|---|---|---|
| EP | 2985385 | A1 | 2/2016 |
| GB | 2266863 | A | 11/1993 |
| WO | 2015007930 | A1 | 1/2015 |

* cited by examiner

DEVICE FOR PRINTING IMAGES ON FLOOR SURFACES

TECHNICAL FIELD

The invention relates to a device such as, e.g. an autonomous mobile robot or a remote controlled vehicle for printing, pixel by pixel, images on a ground surface.

BACKGROUND

When, for example, certain events take place (in particular large events such as, e.g. motor races or football games, etc.) large-scale images (e.g. sponsor logos, etc.) often need to be applied to ground surfaces. These images may be comparatively large (e.g. more than 100 square meters) in order that they be clearly visible from a long way off (e.g. for aerial photographs). An image can be spread out on the ground, e.g. in the form of a large banner. Alternatively, an image can also be manually sprayed or painted onto a lawn, for example using stencils and color spray. If a multi-colored image is required, this will have to be applied in a time consuming procedure consisting of numerous stages and using numerous pre-fabricated stencils. Fabricating the required stencils is time consuming and handling them is difficult. Furthermore, applying the paint manually may produce an unclean image. It may also be desirable to produce large-scale images or words for other uses, as well, e.g. as advertisement near busy streets (e.g. highways), in highly-frequented pedestrian areas, or to mark rooftops, streets or ground surfaces.

Hence, the underlying objective of the invention consists in providing a device and a method that make it possible to apply large-scale images onto ground surfaces such as, for example, lawns, snow-, asphalt- or gravel-covered surfaces quickly, reliably and at a reasonable price.

SUMMARY

A device for printing an image onto a ground surface is described. In accordance with one exemplary embodiment the device comprises a control system and a printing system. The printing system comprises at least one colorant tank with colorant and at least one sprayer arm with numerous nozzle assemblies arranged next to one another. Each of the nozzle assemblies has a valve, which can be controlled by the control system, and a colorant nozzle through which the colorant can be applied to the ground surface.

Further, a method for printing an image on a ground surface using a device is described which, in accordance with one exemplary embodiment, comprises a printing system consisting of at least one sprayer arm with numerous nozzle assemblies arranged next to one another. Each of the nozzle assemblies comprises a controllable valve and a colorant nozzle. In accordance with this exemplary embodiment, the method comprises moving the mobile robot through a first path segment and controlling the vents of the nozzle assemblies to dispense colorant through a colorant nozzle belonging to the valve. When doing so, for every point on the image and for every color, a command to print that depends on the position of the robot is generated for the valves, thus applying the image to the ground surface pixel by pixel.

One embodiment relates to a cleaning method for cleaning the nozzle assemblies of a sprayer arm, wherein every nozzle assembly has a colorant nozzle and a respective cleaning nozzle. The method comprises supplying cleaning fluid to the cleaning nozzle so that the cleaning fluid flows out of the cleaning nozzle and is sprayed onto the outside of the colorant nozzle as well as introducing cleaning fluid into the inside of the colorant nozzle so that the cleaning fluid flows out of the colorant nozzle.

SHORT DESCRIPTION OF THE FIGURES

The invention is described in greater detail with reference to the examples illustrated in the figures. The figures are not necessarily true to scale and the invention is not limited to the embodiments and aspects illustrated here. Instead importance is given to illustrating the underlying principles of the invention. The same reference signs are used in the figures to designate the same or similar components having the same or similar meaning or function.

Figure 1:
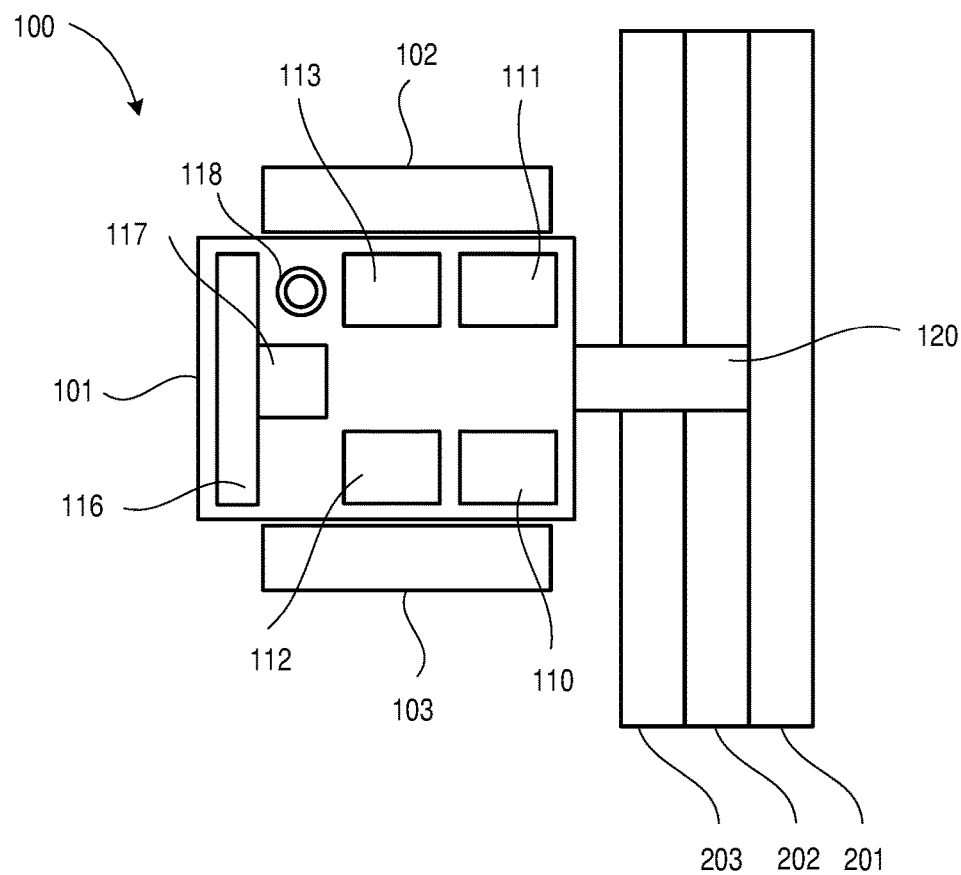
FIG. 1 shows a schematic illustration from above (top view) of an example of a robot for printing on ground surfaces.
Figure 2:
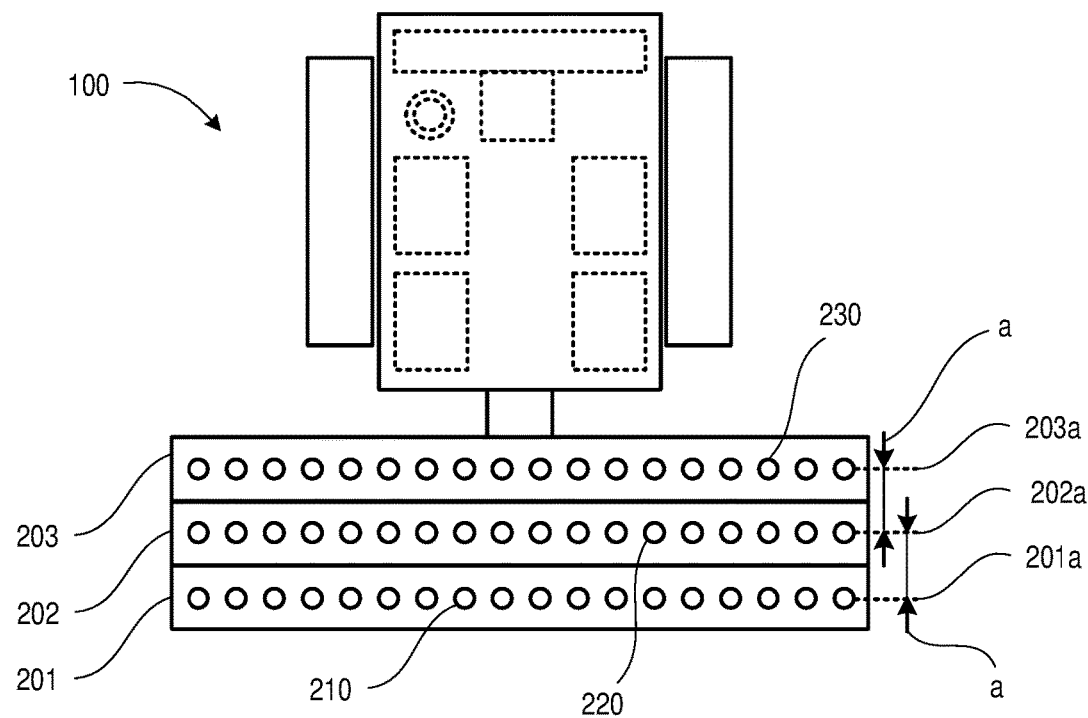
FIG. 2 shows a schematic illustration from below (bottom view) of the robot in accordance with FIG. 1.
Figure 3:
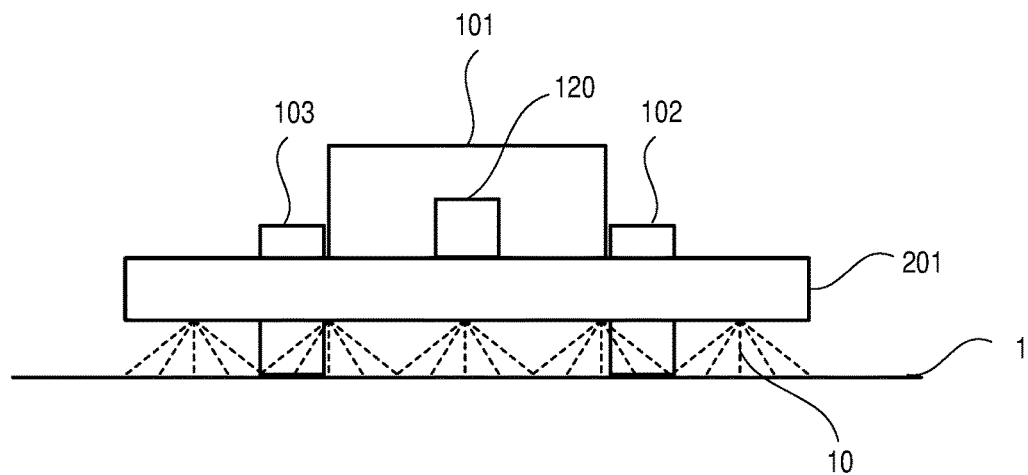
FIG. 3 shows an illustration of the robot in accordance with FIG. 1 from the front (face view).
Figure 7:
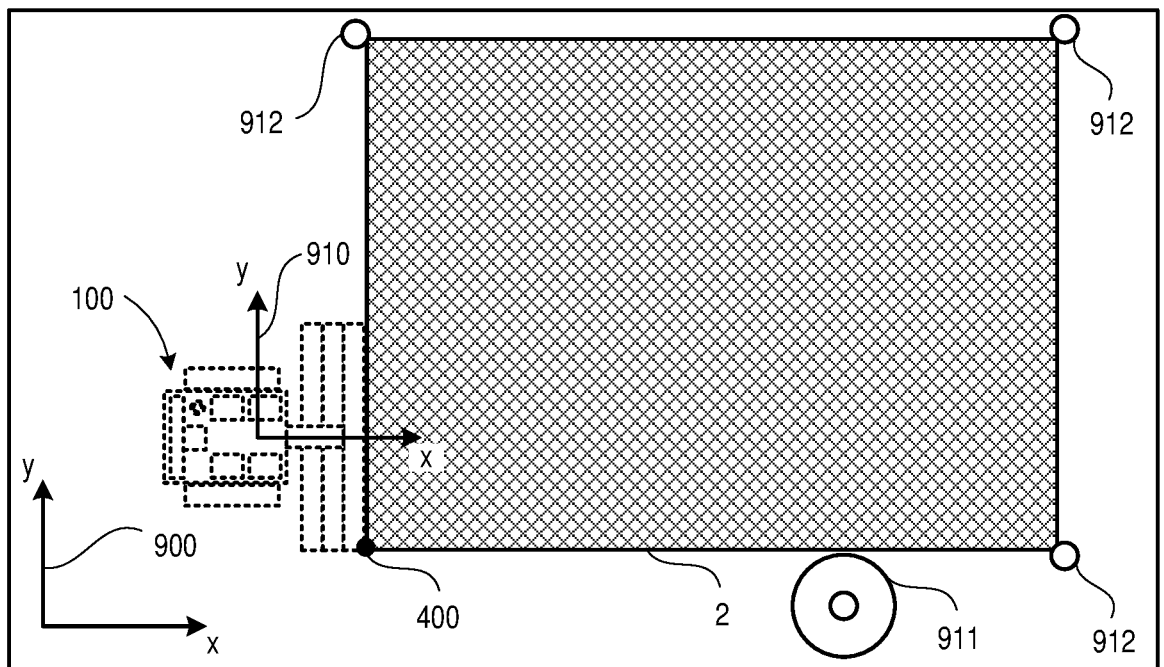

FIG. 7 uses a view from above to illustrate the printing of a ground surface by means of the robot in accordance with FIGS. 1-3.

Figure 8:
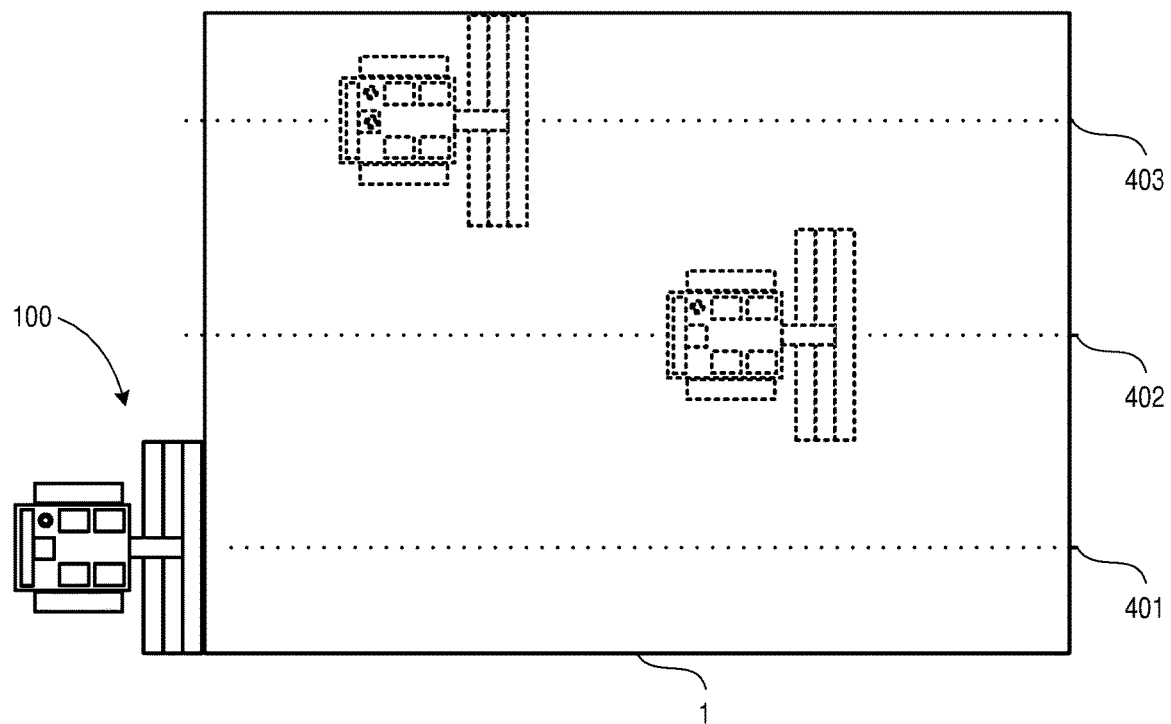

FIG. 8 is view from above of an exemplary travel path (trajectory) of the robot over the area to be printed.

Figure 9:
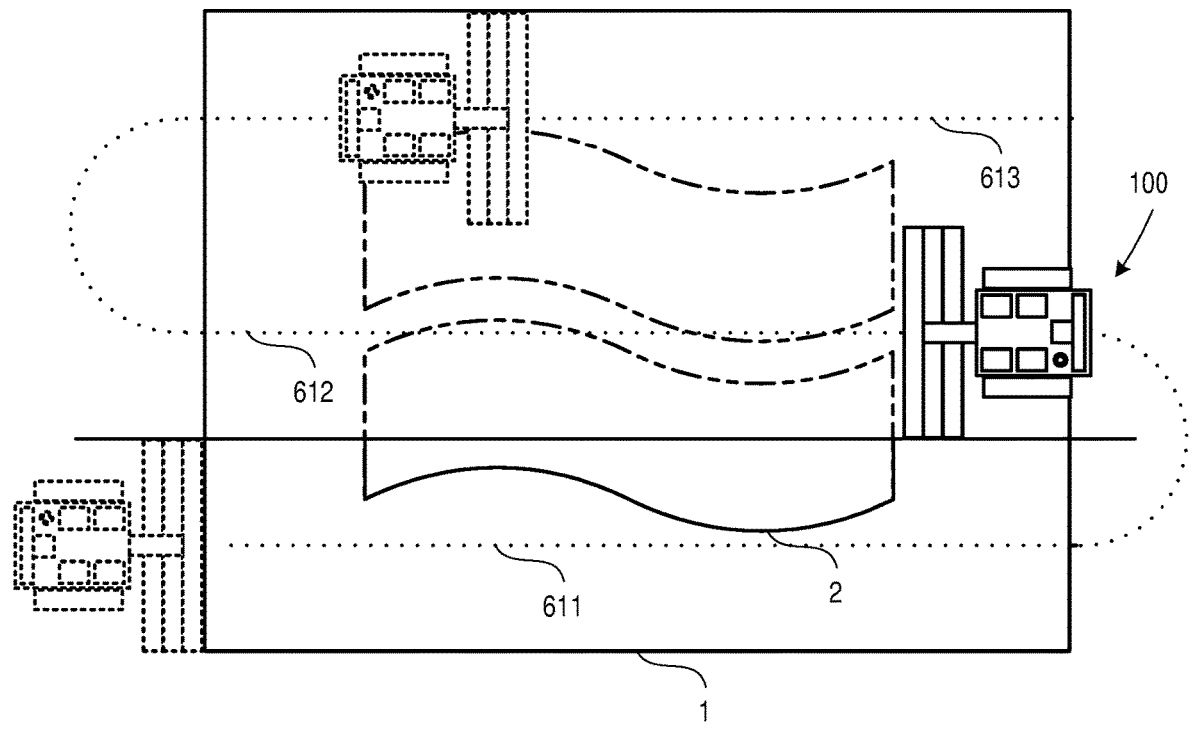

FIG. 9 shows a further exemplary robot trajectory over the area to be printed.

Figure 10:
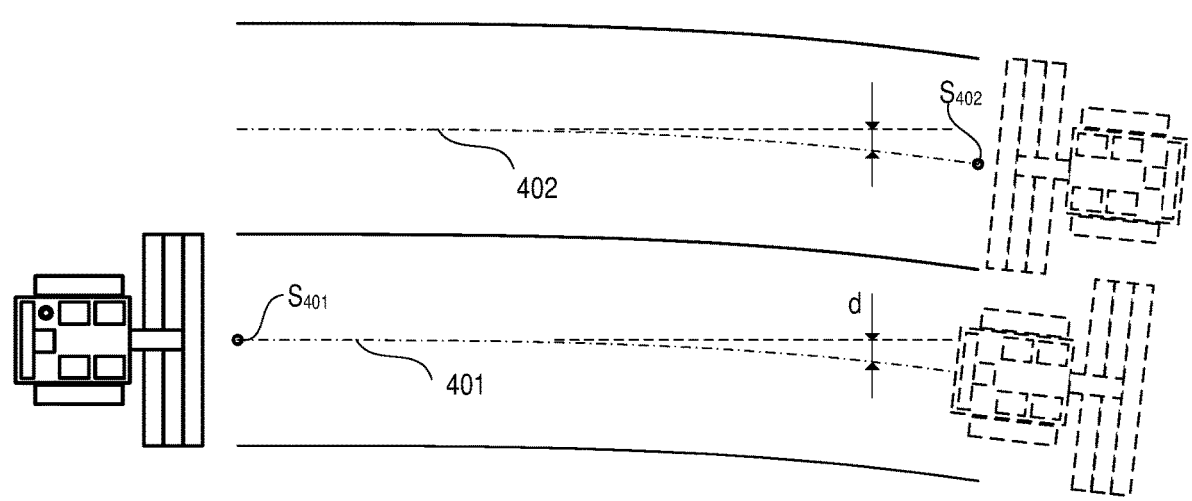

FIG. 10 illustrates how the robot trajectory adapts a path segment to the section of the image that was printed while travelling through the previous path segment.

DETAILED DESCRIPTION

FIG. 1 uses a schematic top view to illustrate an example of a robot 100 for pixel-by-pixel printing on ground surfaces. The robot 100 has a housing 101 that is mechanically connected to at least one chassis or that may be arranged thereupon. In the present example the chassis is a track chassis comprising the two tracks 102 and 103. Instead of tracks, the robot can also have wheels. A combination of tracks and wheels is also possible.

The tracks or the wheels are driven, for example, with an electromotor that is supplied with energy from a battery arranged in the robot 100. Other kinds of drives are also possible. At least one colorant container (e.g. colorant tanks 110, 111 and 112), a cleaning fluid container (cleaning fluid tank 113), an electric transformer 116 (current or voltage transformer) and a control unit 117 can be arranged in or on the housing 101. Depending on the battery used and the electrical characteristics of the drive, the transformer 116 can also be omitted. The control unit 117 may optionally be configured to receive control commands or to send status information (for example, regarding the battery level or the progression of the printing process) by means of an antenna 118. The antenna 118 may be, for example, a WLAN antenna. The transformer 116 may be, for example, an DC/DC transformer for converting the battery voltage into the operating voltage needed to operate the robot (e.g. 24 V). The colorant tanks 110, 111 and 112 and the cleaning fluid tank 113 may be replaceable plastic containers. These may be (directly or indirectly) attached to the housing, e.g. by means of quick release fasteners, to allow for a speedy replacement of the tanks.

In general the control until 117 may be configured to navigate the robot autonomously over the ground surface. As an alternative the control unit 117 may move the robot in accordance with control commands received from a remote control operated by service personnel. The control unit 117 may also have assisted movement functionalities that enable the device to, at least partially, autonomously navigate. It may be the case that, due to legal requirements, a driver must be present in the vehicle. When in operation, the device or robot moves along a trajectory. The robot's path may be divided into numerous path segments through which the trajectory can essentially follow a straight line. While moving through one such path segment, numerous image lines of a section of the image to be printed are printed onto the ground surface pixel by pixel. While moving through the next path segment that is adjacent to the preceding one, numerous image lines of a further section of the image to be printed are printed onto the ground surface pixel by pixel. One challenge that controlling the robot encounters consists in printing the adjacent image sections as "seamlessly" as possible.

The apparatus/the robot 100 may have sensors for determining its own position (location and orientation). The sensors for determining its position may be based on various measurement principles, for example on odometry (e.g. when using one or more wheel rotation sensors), camera-based odometry, location determination by means of GPS (e.g. differentiated GPS), etc. Sprayer arms 201, 202, 203, also designated as nozzle arms, may be attached to the robot 100 (e.g. to its body) via a boom 120. The boom 120 holds the sprayer arms 201, 202, 203 at a specified distance above the ground surface to be printed. This distance may be adjustable. For this purpose the robot 100 may have, e.g. an actuator (not shown) that can raise or lower the boom 120, thus raising or lowering the sprayer arms 201, 202, 203. The sprayer arms 201, 202, 203 may be separate components or they may be combined in one assembly.

At least one nozzle assembly 210 may be arranged at the other end of the boom 120. Five nozzle assemblies may form a nozzle module and each of the numerous nozzle modules may form a nozzle arm 201, 202, 203. In the example shown here, the robot 100 has three nozzle arms 201, 202, 203, each of which has 40 nozzle assemblies. Each sprayer arm may comprise one or more sprayer modules, wherein each sprayer module comprises numerous nozzles through which colorant can be sprayed onto the ground surface. Every nozzle applies a certain colorant to exactly one pixel of the image to be printed. If a multicolored image is to be printed, a corresponding colorant is repeatedly applied to each individual pixel of the image to be printed. In accordance with one exemplary embodiment, a sprayer arm has eight sprayer modules, each of which has 5 nozzles, so that a sprayer arm comprises 40 nozzles and can thus simultaneously apply color to 40 pixels in a row.

FIG. 2 shows the robot 100 from below. Shown here are, inter alia, the three sprayer arms 201, 202, 203 with the respective nozzles 210, 220, and 230 (colorant nozzles). The distance between two neighboring nozzles corresponds to that between two pixels (pixel pitch). The sprayer arms 201, 202 and 203 are arranged parallel to each other forming three parallel rows of nozzles, wherein each of the nozzles 210, 220, 230 can be arranged on a longitudinal axis 201*a*, 202*a*, 203*a* of the corresponding sprayer arm 201, 202, 203. The distance a between two neighboring sprayer arms (and thus between longitudinal axes 201*a* and 202*a*, as well as between longitudinal axes 202*a* and 203*a*) may be an integral multiple of the distance between two neighboring nozzles (i.e. the pixel pitch). In one exemplary embodiment the distance a equals five times the pixel pitch.

FIG. 3 is a schematic face view of the robot 100. The robot 100 is standing with the tracks 102 and 103 of the track chassis on a ground surface 1 that is to be printed during the operation as the robot moves over the ground surface. The ground surface 1 to be printed may have various topographies, e.g. it may be a lawn, an asphalt surface, a snow-covered incline, etc. The ground surface need not be smooth. In the present face view only the sprayer arm 201 can be seen (it obstructs the view of the sprayer arms 202 and 203 behind it). Colorant can be applied to the ground surface 1 pixel by pixel over the previously mentioned nozzles 210, 220 and 230 while the robot 100 moves over it.

A three-colored image can be created using the three sprayer arms 201, 202, 203, wherein each individual pixel can be given a specified color by means of subtractive coloring. For this purpose, the sprayer arm 201 may be supplied with magenta colorant, the sprayer arm 202 with yellow colorant and the sprayer arm 203 with cyan colorant, for example. As the robot 100 moves forward, each individual pixel at a defined position on the ground surface can be subsequently colored magenta, then yellow and then cyan. The amount of colorant applied by each individual nozzle can be controlled. The relative proportions of magenta/yellow/cyan determine the color and the amount of colorant applied determines its intensity. Here it should be pointed out that a fourth sprayer arm with black or white colorant may also be used. Even more than four sprayer arms may be provided to create multi-colored images, for example five sprayer arms with the colors cyan, magenta, yellow, black and white, enabling the creation of an image in accordance with the CMYK color model (a white colorant may also be needed depending on the color of the ground surface).

Figure 4:
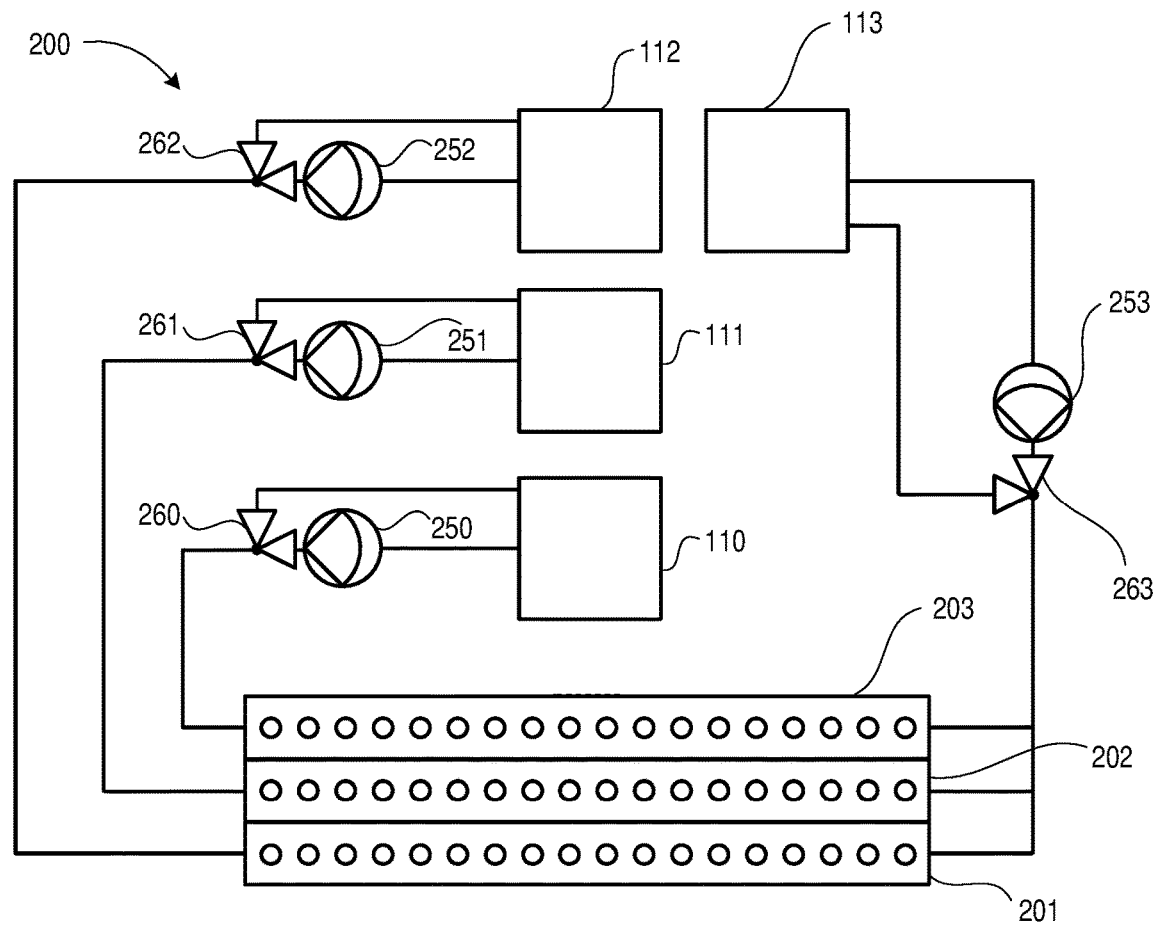
FIG. 4 shows a schematic diagram of an example mode of operation of a printing unit (sprayer arm) with numerous nozzles for apply colorant pixel by pixel.

The printing system 200 of the robot 100 is exemplarily illustrated in FIG. 4. The printing system comprises, inter alia, the sprayer arms 201, 202, 203, the colorant tanks 110, 111, 112, the cleaning fluid tank 113, membrane pumps 250, 251, 252, 253 for pumping the colorant out of the colorant tanks and the cleaning fluid out of the cleaning fluid tank, pressure relief valves 260, 261, 262, 263 and the conduits that connect the individual components to each other. The diagram in FIG. 4 shows, similarly to a signal flow diagram, the supply flow of colorant from the colorant tanks 110, 111, 112 to the sprayer arms 201, 202, 203, as well as the supply flow of cleaning fluid from the cleaning fluid tank 113. The membrane pumps 250, 251, 252 pump colorant from the colorant tanks 110, 111, 112 to the sprayer arms 201, 202, 203 (or to the sprayer modules that may comprise the sprayer arms). The construction of the sprayer arms and that of the individual sprayer modules will be described in detail further on. The present example is suitable for printing with three colors. To print with four, five or more colors, a corresponding number of additional colorant tanks and sprayer arms can be provided.

The suction sides of the membrane pumps 250, 251, and 252 are hydraulically connected to the colorant tanks 110, 111, 112, and their discharge sides are connected to the sprayer arms 201, 202, 203. Pressure relief valves 260, 261, 262 may optionally be arranged between the discharge sides of the membrane pumps 250, 251, 252 and the colorant tanks 110, 111, 112. Excess colorant can then be pumped back into its respective colorant tank via the pressure relief valves 260, 261, 262. This may be necessary if the membrane pumps discharge more colorant than the spray arms apply, in which case the pressure relief valves 260, 261, 262 help to prevent an overload of the membrane pumps 250, 251, 252. The membrane pumps 250, 251 and 252 may also have pulsation dampers to ensure an even supply of colorant from the colorant tanks.

Supplying cleaning fluid from the cleaning fluid tank 113 to the sprayer arms 201, 202, 203 can be done in the same manner as the supplying of the colorant. In this case, the description of how the membrane pumps 250, 251, 252 supply colorant from the colorant tanks also applies to the manner in which the membrane pump 253 supplies cleaning fluid from the cleaning fluid tank 113. The membrane pump 253 can also be combined with a pressure relief valve 263 to avoid an overload of the membrane pump 253 by pumping excess cleaning fluid back into the cleaning fluid tank 113. In this connection it should be pointed out that other types of pumps may also be used. Printing systems are also known that can do without pumps. In this case, e.g. the colorant tanks can be pressurized (e.g. using compressed air). In general, the printing system 200 must be equipped with some components that are configured to supply the sprayer arms (or the individual sprayer modules) with colorant and cleaning fluid under a defined pressure.

Figure 5:
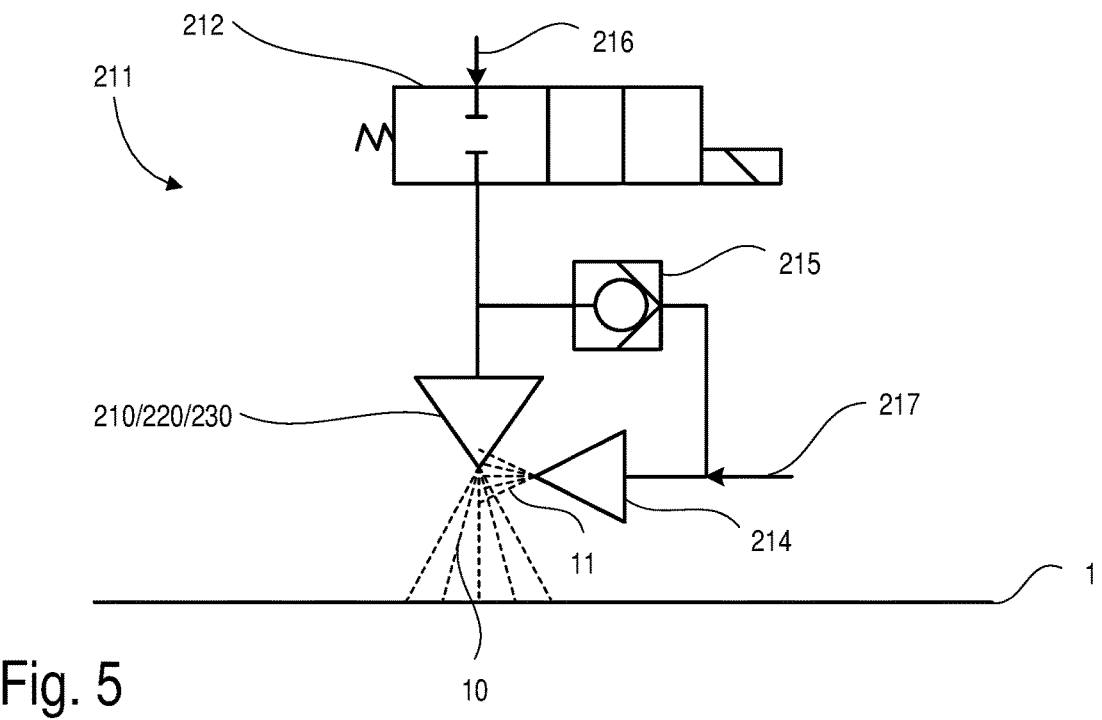
FIG. 5 is the schematic illustration of a nozzle for applying colorant arranged in a sprayer arm.

The individual colorant nozzles 210 are arranged in the sprayer arm 201 (cf. also FIG. 2), wherein every assembly 211 (nozzle assembly) has a corresponding colorant nozzle 210, as well as a valve 212 for controlling the amount of colorant applied by the colorant nozzle 210, a cleaning nozzle 214 and a check valve 215 that allows for the flow of cleaning fluid to the colorant nozzle 210 but that prevents colorant from flowing into the conduit 217 for the cleaning fluid. An exemplary design of the aforementioned nozzle assembly is shown in FIG. 5. Depending on the intended use, the nozzle assembly 211 can also be constructed in a different manner. For example, cleaning the outside of the colorant nozzle 210 may not be absolutely necessary and the separate cleaning nozzle 214 may be omitted. In other cases the check valve 215 may also be omitted and the colorant nozzle is then only cleaned on the outside.

In the example shown in FIG. 5, the nozzle assembly 211 has a conduit 216 for colorant and a conduit 217 for cleaning fluid. Colorant 10 from one of the colorant containers 110, 111 and 112 can be supplied to the nozzle assembly 210 via the conduit 216. Water 11 from the water container 113 can be supplied to the nozzle assembly via the conduit 217. The conduit 216 is hydraulically connected to the inlet of the colorant nozzle 210, for example, via a controllable valve 212. The valve 212 may be an electromechanically controllable 2/2-way valve (e.g. a magnetic valve) and can control the amount of colorant applied via the colorant nozzle 210.

The inlet of the cleaning fluid nozzle 214 can be connected to the cleaning fluid tank 113 via the conduit 217 and thus supplied with cleaning fluid 11. The cleaning fluid nozzle 214 can be directed at the colorant nozzle 211 so that cleaning fluid 11 discharged from the cleaning fluid nozzle 214 can be sprayed on the outside of the colorant nozzle 210, thus cleaning it of colorant remnants. The inlet of the colorant nozzle 210 may also be additionally connected to the conduit 217 via the check valve 215 so that, during cleaning, the cleaning fluid 11 also flows through the colorant nozzle 210 and cleans it on the inside as well. The check valve 215 prevents colorant from flowing into the conduit 217 for the cleaning fluid during printing.

Figure 6:
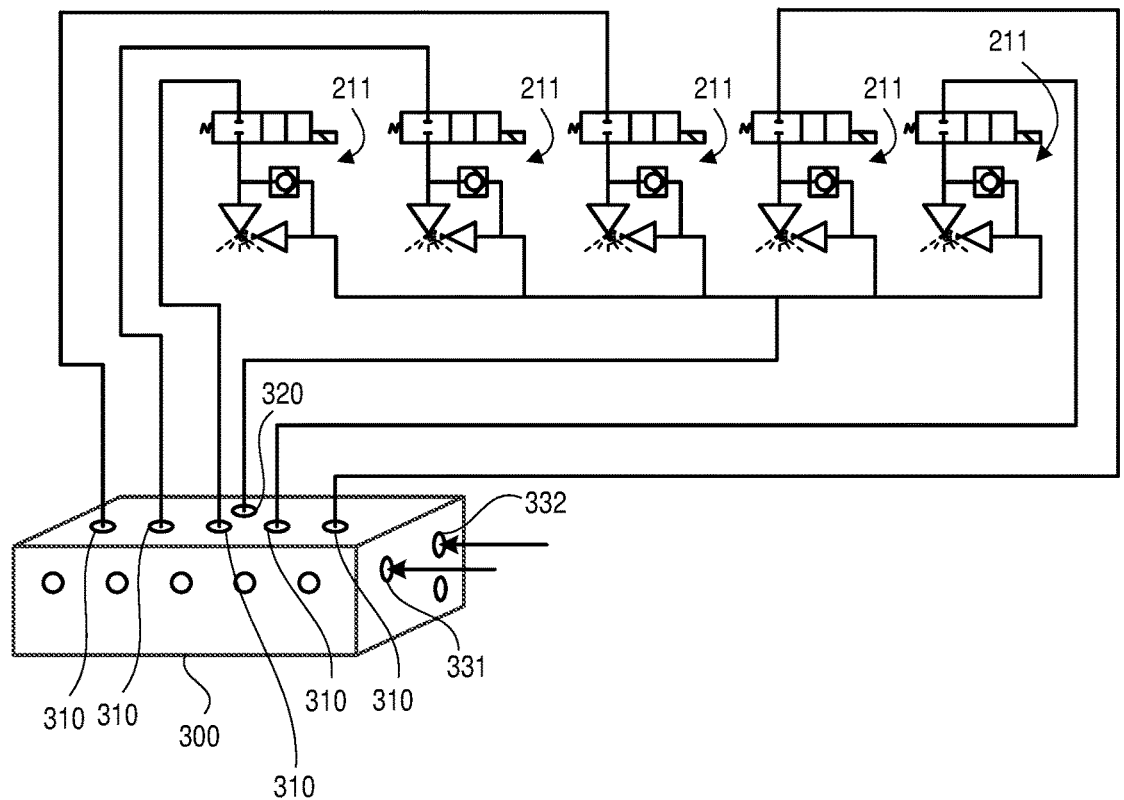
FIG. 6 shows a schematic structure of an exemplary sprayer module, wherein a sprayer arm may consists of one or more sprayer modules arranged next to one another.

FIG. 6 shows the schematic design of a sprayer module. As mentioned previously, the sprayer arms 201, 202, 203 may each be comprised of one or more sprayer modules. In the present example the sprayer module has five sprayer assemblies 211 (each with a colorant nozzle 210), connected hydraulically to the colorant containers 110, 111 and 112 and the water container 113 via a distribution unit 300. The distribution unit 300 can be a metal cuboid block with numerous bores that are partially hydraulically connected to each other. In the present example the distribution unit 300 may comprise at least one inlet 331, an outlet 332, one or more outlets 310, as well as an outlet 320. The inlet 331 is hydraulically connected to one of the colorant containers 110, 111 or 112. The inlet 332 is hydraulically connected to the water container 113. The distribution block 300 connects the inlet 331 for the colorant to the outlets 310 and connects the inlet 332 for the cleaning fluid to the outlet 320. The outlets 310 can also be designed to serve as a retainer for the nozzle assemblies 211. In accordance with one example, the colorant nozzles 210 of the nozzle assembly 211 may be screwed into the outlets 310.

FIG. 7 is a top view of a ground surface 1 on which the robot 100 is located, wherein an image 2 has been printed onto a section of the ground surface. FIG. 7 serves to illustrate the printing method carried out with the aid of the robot 100. In order to print the image 2 onto the ground surface 1, the robot 100 can first be placed at a starting point 400 and pointed in a desired direction. If the image has a rectangular form, the starting point 400 can be a corner point of the image 2. In the example shown, one corner of the foremost spraying arm 201 of the robot 100 is positioned at starting point 400. Without limiting the generality of the foregoing, the position of the robot 100 may be defined as the position of the rightmost colorant nozzle 210 of the foremost sprayer arm 201.

The image 2 to be printed may at first exist as a raster graphics image that is electronically stored in an image file. Any other common data format (e.g. JPEG File Interchange Format (JFIF), Portable Network Graphics (PNG), Tagged Image File Format (TIFF), etc.) is possible. The image file is then converted into image data that can be further processed by the robot 100 by means of a software (Resizer Software) and saved in a machine-readable file after having first undergone a color separation. This means that the color data contained in the image file regarding the individual pixels (e.g. red, green and blue values, each 8 bit, for a 24 bit color depth) is converted (in the colorant containers 110, 111 and 112) into corresponding amounts of colorant to be used. The raster graphics are then scaled to the desired size of the image. When doing so, the number of pixels is adapted such that the pixel pitch of the desired image size corresponds to the distance between the colorant nozzles 210 in the sprayer arms of the robot 100.

The image data, having been thus processed for the robot, can be transmitted to the control unit 117 (see FIG. 1) of the robot 100 via a communication interface. The communication interface may be, e.g. a USB interface. In addition to this, a wireless transmission, for example, via a WLAN module integrated in the robot 100, is also possible. Additionally or alternatively to WLAN (radio communication in accordance with one of the IEEE 802.11 standards), other wireless connections (e.g. Bluetooth, ZigBee, etc.) may also be used. The control unit 117 of the robot can be configured, for example, to calculate from the image data a path of movement for the robot 100 (robot path, trajectory) and to then direct the chassis (e.g. tracks 102 and 103) to follow the calculated robot path using corresponding movement commands. From the image date the control unit 117 can also generate control commands for the membrane pumps 250, 251, 252 and 253 and for the valves 212 of the robot 100. The amount of colorant applied to the ground surface is directly controlled via the valves 212.

As the image to be printed usually is in the form of raster graphics, it also defines a global, stationary (Cartesian) coordination system 900. This coordination system can also be used by the robot control unit 117 to navigate the robot 100 over the ground surface. For this, the robot control unit requires that the location $\vec{x}_r^t$ of the robot in the global coordination system $$\vec{x}_r^t = (x_r^t, y_r^t, \theta_r^t)$$

be known at every point in time t. The coordinates $x_r^t$ and $y_r^t$ designate the location of the robot 100 in the global coordination system 900 of the robot and $\theta_r^t$ designates the orientation of the robot (the angle between the x-axis of the global coordination system 900 and a coordination system 910 that moves along with the robot). The sensor data gathered by the robot is generally available in the local coordination system 910 of the robot and can be transformed into the global coordination system using coordination transformation. Once the robot 100 has arrived at a determined (global) position $\vec{x}_r^t$, it begins to execute a command to print b(c) and colorant is applied to the ground surface 1 via the sprayer arms 201, 202, 203. As the robot moves along the previously calculated (e.g. meandering) path, the image 2 is "printed" onto the ground surface pixel by pixel.

As long as the robot 100 is moving along a straight-lined trajectory of a straight-lined path segment, practically any number of image points (pixel) can be printed along a line of the image, wherein as many lines of the image can be printed simultaneously as a sprayer arm has colorant nozzles (in the examples described above there are 40 colorant nozzles). In order to create a clean image, the colorant nozzles must be controlled (by means of the valves 212, see FIG. 5) in regular intervals (printing commands $b(\vec{x}_r^t)$). For this purpose the robot 100 must regularly determine its location (incl. orientation) in the global coordination system 900. This procedure is also called "localization". In order to conduct a continuous localization the robot 100 can analyze sensor data from one or more sensors. One possible method for localization of the robot 100 is odometry. This means that the robot determines its location based on the path it has traveled, which itself can be determined, e.g. using rotary encoders on the tracks or wheels. The use of odometry to determine the location and orientation of mobile robots in a coordination system is well known and will therefore not be described further here.

Odometry based on rotary encoder sensor data is only precise over short distances and the determined location of the robot may drift away from its actual location (e.g. due to slippage). In order to improve the accuracy of the localization, further sensors can be used in addition to the rotary encoders which implement different measurement principles such as, e.g. a camera for camera-based odometry, distance sensors such as, e.g. laser scanners for SLAM (Simultaneous Localization and Mapping), and/or receivers for satellite-assisted tracking (GPS tracking and DGPS tracking). To improve accuracy, the control unit 117 of the robot can be configured to consolidate sensor date from various sensors (Sensor Data Consolidation). For example, the location determined by means of odometry (using rotary encoders) can be periodically corrected based on the sensor data of other sensors (e.g. DGPS receiver). The robot 100 can also use distance sensors (e.g. laser scanners) to detect landmarks, measure (e.g. using triangulation) the position of the robot 100 relative to the detected landmarks and then use the thus determined position to correct the odometry results. Generally speaking, landmarks are objects that have a known location. In FIG. 7 the object 911 (e.g. a tree) and the objects 912 (e.g. marking poles with reflectors) are shown.

Artificial objects 912 distributed throughout the terrain may ensure that even in a, e.g. hilly terrain, enough landmarks will be present within the range of detection of the robot's sensors to carry out a localization. The location of the objects 911 and 912 can be saved by the robot 100 in an electronic map. The map may also contain the locations of the individual pixels of the image to be printed 2. Once the robot has arrived at a location at which a given group of image points is to be printed, the robot control unit can generate a printing command that correspondingly controls the valves 212 in the sprayer arms.

FIG. 8 shows an example of a possible path (trajectory) along which the robot moves while printing the image 2. The robot path can be made up of numerous straight-lined path segments 401, 402 and 403 through which the robot moves one after the other. In the example shown, the robot 100 moves over the ground surface 1 through the path segments 401, 402 and 403. While doing so, each path segment 401, 402 and 403 is traveled through in the same direction, which the robot 100 does by moving from the end of each path segment 401, 402 to the beginning of the respective next path segment 402, 403.

In the example according to FIG. 9 the robot path also consists of parallel straight-lined path segments 611, 612 and 613. As opposed to the preceding example, however, the robot travels through the path segments 611, 612 and 613 following a meandering path. In the following, the printing method carried out by the robot 100 will be summarized. To begin with, the robot 100 is placed at the starting point 400 (cf. FIG. 7). Directly preceding or following this, image data values that can be processed by the robot are calculated from an image file, as described above, and these are transmitted to the control unit 117 of the robot 100. Using these image files the control unit 117 of the robot can plan a robot path along which the robot will then move across the ground surface 1. While the robot moves it continuously determines its location (and orientation) in a global coordination system in which the individual image points (pixel) are also designated. Once the robot arrives at a location at which one or more image points are to be printed, the robot control unit 117 generates a printing command to control the valves 212 in the sprayer arms 201, 202, 203 (cf. FIGS. 1-5).

An "image point" or pixel can have, e.g. a nearly oval or rectangular shaped surface with a length in the range of 20 to 38 mm and with a width in the range of 10 to 19 mm. Every pixel can be individually sprayed with colorant by the robot 100. Each of the sprayer arms 201, 202 and 203 can apply a different color to the ground surface 1, wherein for multi-colored images, colorant of different colors (e.g. white, cyan, magenta, yellow and black) can be consecutively applied to the same image point (pixel). As an alternative, a pixel can be divided up into numerous sub-pixels, wherein every sub-pixel is printed with a different color.

In regular intervals or when certain events occur (e.g. when the end of a path segment is reached or after changing the colorant, etc.), a cleaning of the colorant nozzles 210 can be carried out. For this purpose, cleaning fluid 11 from the cleaning fluid container 113 can be forced through the colorant nozzles 210 to remove paint remnants from the colorant nozzles 210 (cf. FIG. 5). In addition to this, using the cleaning nozzles 214, cleaning fluid 11 can also be sprayed on the outside of the colorant nozzles 211, thereby also removing colorant remnants on the outside of the nozzles 210. During the cleaning, valves 212 may be closed. Regular cleaning can help ensure that the nozzle assemblies 211 remain fully functional throughout the entire printing process and that the finished image 2 will be of good quality. At the end of path 611, the robot 100 turns around by 180° and then moves over the ground surface 1 along path 612 in the direction opposite to that of path 611 while printing a further section of the image 2. The robot 100 can be directed to move precisely along a previously printed section. For this purpose the robot 100 can be equipped with a camera system that analyzes the previously printed sections of the ground surface 1 using image processing and passes the thus obtained information on to the control unit 117. The image processing is primarily configured to compare the printed section of the image previously recorded by the camera to a "target image" and to determine any possibly occurring deviations.

By means of a camera-based analysis of the printed section (e.g. the section of the image created while moving over the first path segment 401, see FIG. 8), the positioning and orientation of the robot 100 can be improved before printing a subsequent section of the image (e.g. the section of the image that is to be printed while moving through the second path segment 402, see FIG. 8). In order to align the two path segments (e.g. path segments 401, 402) with one another as well as possible, the robot 100 can analyze (e.g. before printing or even while printing the second section of the image), using camera recordings and image processing, the section of the image printed while moving through the preceding (first) path segment, and can align the second path segment (and thus the second section of the image) with the first section of the image. Thus, in this example the actual progression of the second path segment may deviate from the theoretical target progression as the robot trajectory can be continuously corrected while moving through the second path segment to adapt the robot trajectory of the second path segment (and thereby the second section of the image) to the first image section. This situation is illustrated in FIG. 10.

FIG. 10 illustrates the adaptation of the robot trajectory of a path segment 402 to the image section printed while moving over the preceding path segment 401. A case is assumed in which the robot trajectory of the first path segment 401 that was actually followed while printing the first section of the image begins at a starting point S401. While moving along the trajectory of the first path segment 401, a deviation from the straight-lined target trajectory arises (for any number of reasons) having a value d. The value d need not be constant, in the present example the value d increases as the distance from the starting point S401 grows. With the method described above and using cameras and image processing this deviation in the printed section of the image can be analyzed and the trajectory in the following path segment 402 can be corrected by the thus determined value d. This correction can be carried out once before printing in the second path segment begins (to determine the starting point S402 of the trajectory of the second path segment 402) and it can then be carried out continuously while moving through the second path segment 402 in order to adapt the trajectory (based on continuously conducted camera recordings and image processing). Not only the robot trajectory, but also the printing commands (that is, the locations at which a pixel is printed) can be adapted.

The robot 100 may also be equipped with level sensors in the colorant tanks 110, 111 and 112 and in the cleaning fluid tank 113. If the fill level in any of the containers falls below a defined minimum the control unit 117 of the robot 100 can be enabled to at least set off an acoustic or optical alarm. As an alternative, the control unit 117 can autonomously move the robot 100 back to starting point 400 or to a different previously defined point. This allows for a timely refill of colorant 10 and cleaning fluid 11, which can prevent an unplanned interruption of the printing process. This will help to avoid flawed transitions in the printed image by ensuring that the paths 611, 612 and 613 are seamlessly printed in one run.

Images with a lateral length of 20 to 150 m can be printed by the described robot 100 and with the described method. These images can be divided up into smaller sections of images with a lateral length of 30 m each and then printed, one after the other. With the aid of the described systems for localization, the robot 100 can connect the individual sections of the image to each other "seamlessly".

The invention claimed is:

1. An apparatus for printing an image on a ground surface, comprising:
a control unit; and
a printing system comprising:
at least one colorant tank configured to hold colorant;
at least one sprayer arm having a plurality of nozzle assemblies arranged next to one another, each nozzle assembly comprising a valve which is controllable by the control unit and a colorant nozzle configured to apply colorant to the ground surface; and
a cleaning fluid tank connected to at least some of the nozzle assemblies via one or more conduits,
wherein each nozzle assembly has a cleaning nozzle that corresponds to a respective colorant nozzle and that is supplied by the one or more conduits and that is arranged such that cleaning fluid can be sprayed onto an outside of the respective colorant nozzle,
wherein the colorant nozzle of each nozzle assembly is connected to the one or more conduits via a valve so as to allow cleaning fluid to be conducted into an inside of the colorant nozzle and sprayed out of the colorant nozzle.

2. The apparatus of claim 1, wherein the control unit is configured to individually control, depending on a position of the apparatus on the ground surface, one or more valves of each nozzle assembly so that the image is applied to the ground surface pixel by pixel.

3. The apparatus of claim 1, wherein a distance between two neighboring nozzle assemblies corresponds to a distance between two adjacent image lines of the image.

4. The apparatus of claim 1, wherein the control unit is configured to navigate the apparatus along a trajectory over the ground surface while continuously controlling the valve of each nozzle assembly to create individual image points of numerous image lines of the image on the ground surface using the colorant nozzles.

5. The apparatus of claim 4, wherein the trajectory of the apparatus runs nearly straight-lined in two or more adjacent path segments, and wherein the control unit is configured to print mutually adjacent sections of the image while following the trajectory in neighboring image sections of the image.

6. The apparatus of claim 5, further comprising:
at least one camera coupled to the control unit and configured to record an image section of the image that is printed while moving through a first path segment,
wherein the control unit is configured to adapt the trajectory of the apparatus in a second path segment based on the recorded image section.

7. The apparatus of claim 6, wherein the control unit is configured to determine, based on the recorded image section, a starting point for the trajectory of the apparatus in the second path segment.

8. The apparatus of claim 1, further comprising:
one or more sensors configured to gather sensor data regarding the position or movement of the apparatus,
wherein the control unit is configured to determine a position and an orientation of the apparatus from the gathered sensor data.

9. The apparatus of claim 8, wherein the control unit is configured to determine the location and orientation of the apparatus by consolidating the sensor data received from two or more sensors.

10. The apparatus of claim 8, wherein one of the one or more sensors is a wheel rotation sensor, wherein the control unit is configured to determine a position of the apparatus by means of odometry and based on sensor data of the wheel rotation sensor.

11. The apparatus of claim 8, wherein one of the one or more sensors is a receiver of a satellite navigation system.

12. The apparatus of claim 8, wherein one of the one or more sensors is a sensor configured to detect a landmark in the environment and determine a position of the apparatus relative to the landmark, and wherein the control unit is configured to determine the position of the apparatus based on the determined relative position and the known position of the landmark.

13. The apparatus of claim 8, wherein the control unit is configured to generate printing commands for the printing system in dependency of the position of the apparatus, and wherein the printing commands control the valve of each nozzle assembly.

14. The apparatus of claim 1, wherein, for each color, a sprayer arm is provided, wherein the sprayer arms are arranged parallel to one another, and wherein the nozzle assemblies of the sprayer arms are arranged along one line.

15. The apparatus of claim 1, wherein the apparatus is an autonomous mobile robot or is controllable over a remote control device.

* * * * *